United States Patent [19]
Vaughan

[11] Patent Number: 6,097,545
[45] Date of Patent: Aug. 1, 2000

[54] CONCENTRIC LENS WITH ASPHERIC CORRECTION

[75] Inventor: Arthur H. Vaughan, Sierra Madre, Calif.

[73] Assignee: Photobit Corporation, Pasadena, Calif.

[21] Appl. No.: 09/316,701

[22] Filed: May 21, 1999

Related U.S. Application Data

[60] Provisional application No. 60/086,389, May 22, 1998.

[51] Int. Cl.$^7$ ............................ G02B 27/14; G02B 13/18
[52] U.S. Cl. ......................... 359/637; 359/708; 359/715; 359/717
[58] Field of Search ................................ 359/708, 715, 359/717, 741, 637

[56] References Cited

U.S. PATENT DOCUMENTS

| | | |
|---|---|---|
| 4,554,459 | 11/1985 | Tsutsumi et al. ........................ 359/717 |
| 5,166,830 | 11/1992 | Ishibai et al. ........................... 359/717 |
| 5,251,069 | 10/1993 | Iizuka ..................................... 359/717 |
| 5,619,380 | 4/1997 | Ogasawara et al. ..................... 359/717 |

*Primary Examiner*—Loha Ben
*Attorney, Agent, or Firm*—Fish & Richardson P.C.

[57] ABSTRACT

A special concentric lens system having an air gap and at least one aspheric surface is provided to achieve a substantially uniform imaging performance in a wide angle of view with reduced aberrations.

12 Claims, 2 Drawing Sheets

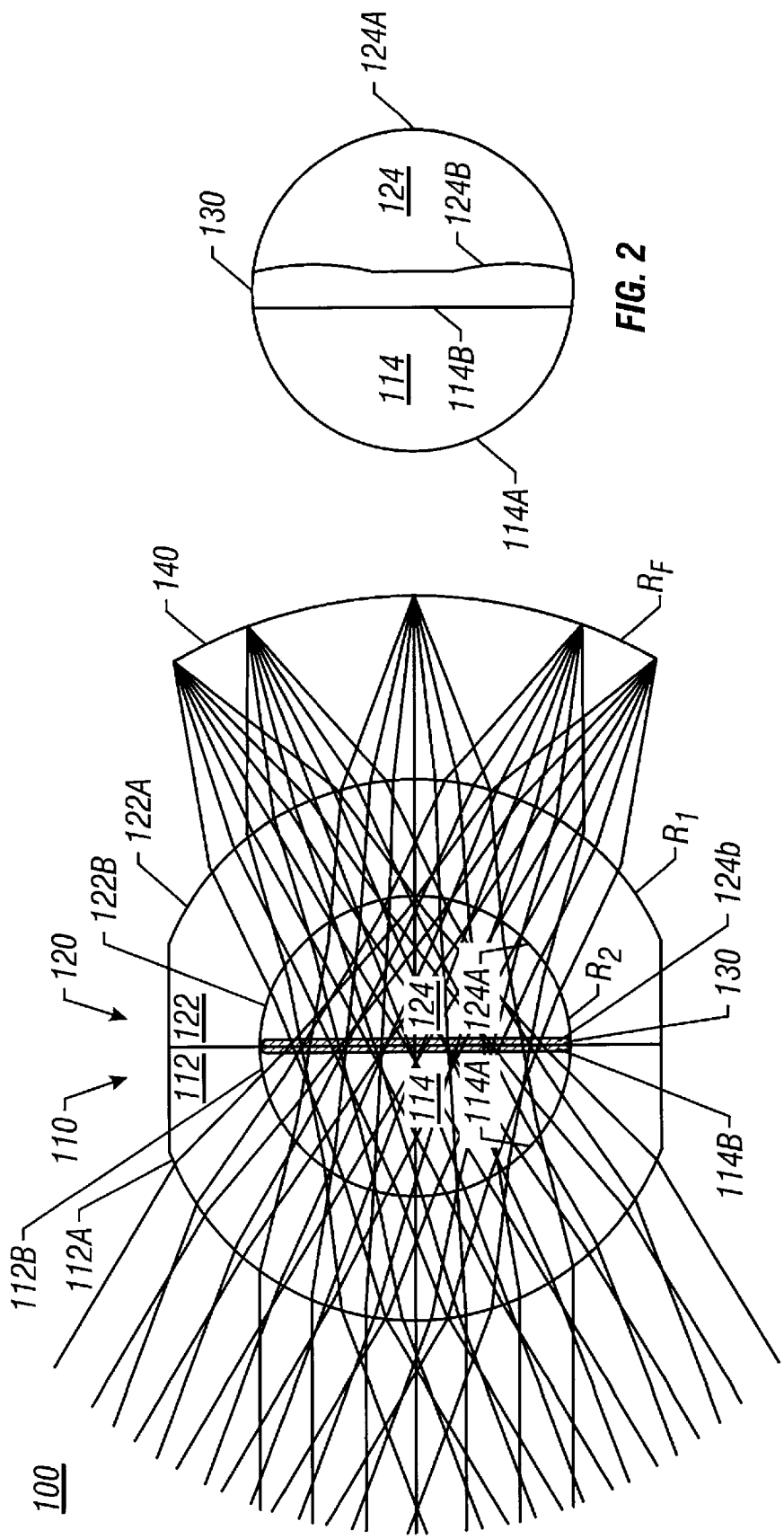

CONCENTRIC LENS WITH ASPHERIC CORRECTION

This application claims the benefit of U.S. Provisional Application No. 60/086,389, filed on May 22, 1998.

FIELD OF THE INVENTION

The present invention generally relates to optical lenses and imaging systems, and more particularly, to imaging systems having concentric lenses.

BACKGROUND

An optical imaging system with a wide angle of view is desirable in a wide range of applications. Many conventional lens systems for wide angles of view are designed to produce a flat focal plane and hence inherently suffer certain aberrations. For example, off-axis aberrations (e.g., coma and stigmatism), spherical aberrations, and chromatic aberrations, may need to be compensated in order to achieve a desired imaging performance. Compensation of such aberrations in the conventional lens systems can compromise the obtainable wide angle of view.

In addition, complex composite lenses are often used in these conventional lens systems to reduce aberrations in a flat imaging plane. Manufacturing of such multi-lens combinations requires sophisticated fabrication and is expensive.

SUMMARY

The present disclosure provides an imaging system and a technique based on a special concentric configuration to produce a substantially uniform imaging performance in a wide angle of view with reduced aberrations. In contrast to the flat focal plane in many conventional systems, this special concentric configuration produces a spherical focal surface that has no preferred optic axis. Hence, a wide angle of view can be achieved and the off-axis aberrations are essentially eliminated. In particular, an air gap and at least one aspheric surface is implemented to reduce the spherical aberration.

One embodiment of this special concentric configuration includes a first optical element and a second optical element optically coupled to each other. The first optical element has a first convex spherical surface of a first radius to receive radiation and a first non-spherical surface to receive the radiation from the first convex spherical surface. The second optical element has a second convex spherical surface of the first radius and a second non-spherical surface, and is positioned relative to the first optical element so that the first and second convex spherical surfaces have a common center of curvature and the first and second non-spherical surfaces are separated from each other by an air gap. At least one of the first and second non-spherical surfaces has an aspheric surface profile to correct spherical aberrations.

The concentric configuration may also include two outer optical elements, each having concentric outer convex spherical surface and a concentric inner concave spherical surface of the first radius. The outer optical elements are respectively coupled to the first and second optical elements by engaging their inner concave spherical surfaces to the first and second convex spherical surfaces, respectively.

These and other aspects and associated advantages will become more apparent in light of the detailed description, the accompanying drawings, and the appended claims.

BRIEF DESCRIPTION OF THE DRAWINGS

FIG. 1 shows one embodiment of a concentric lens system.

FIG. 2 shows one implementation of aspheric surfaces forming an air gap in the center of the concentric lens shown in FIG. 1 to correct spherical aberrations.

DETAILED DESCRIPTION

Figure 3:
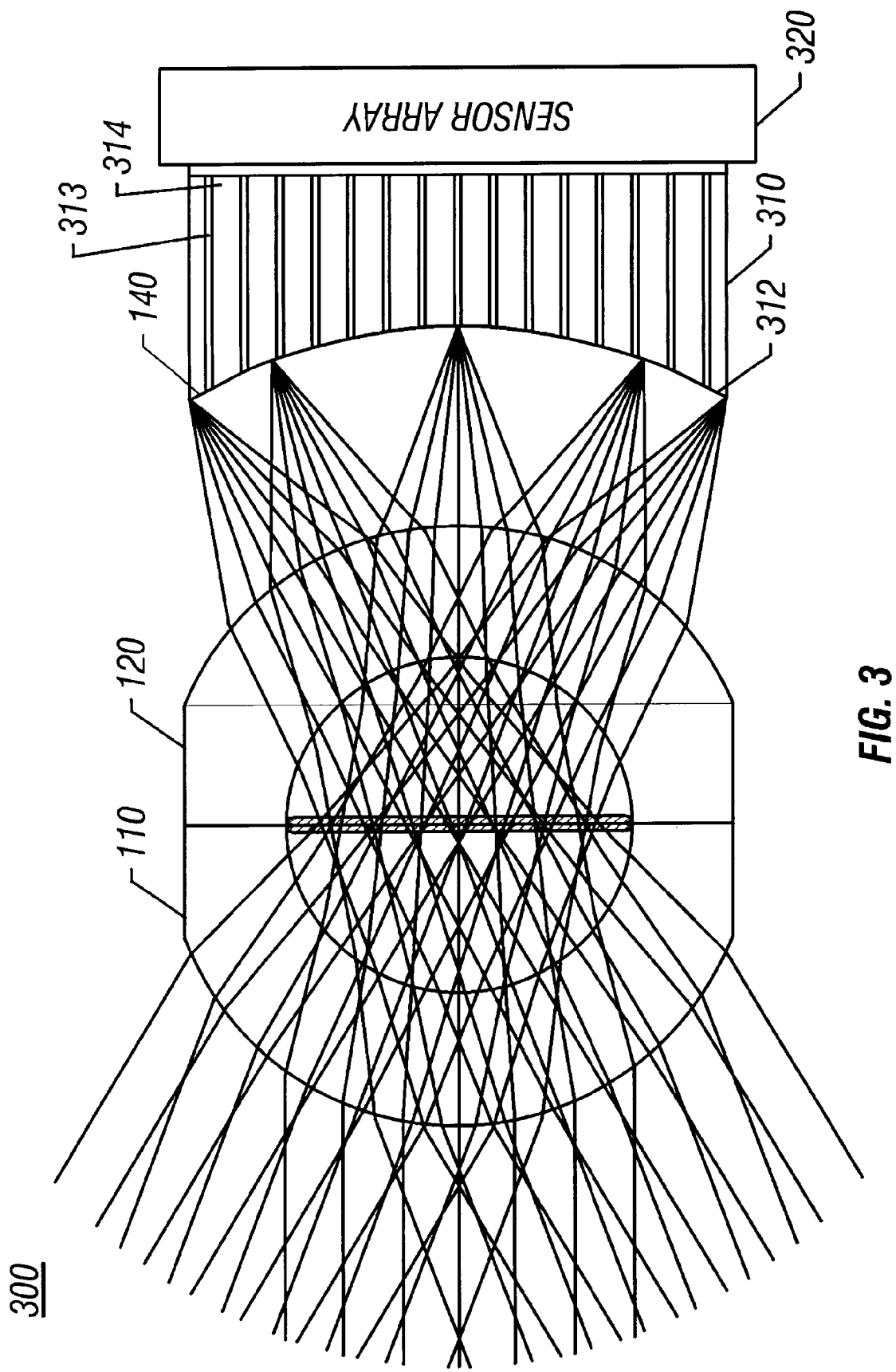
FIG. 3 shows an imaging system based on the concentric lens of FIG. 1.

FIG. 1 shows one embodiment 100 of a concentric lens system. The lens 100 includes two semi spherical parts 110 and 120 of the same radius that are coupled to each other at their aspheric interfacing surfaces. The first semi spherical part 110 has two concentric components, an outer semi spherical part 112 and an inner semi spherical part 114. The outer semi spherical part 112 has two concentric spherical surfaces, a convex surface 112A and a concave surface 112B to form a shell structure. The inner semi spherical part 114 has a convex spherical surface 114A that substantially conforms to the surface 112B. The second semi spherical part 120 is similarly constructed by an outer semi spherical part 122 and an inner semi spherical part 124. The inner semi spherical parts 114 and 124 have aspheric interfacing surfaces 114B and 124B, respectively. The surfaces 114B and 124B are spaced from each other by an air gap 130. This air gap 130 in effect forms a symmetric aperture of the lens 100 which has a radius of $R_2$.

The two semi spherical parts 110 and 120 are so coupled that the spherical surfaces of the lens 100 effect two concentric spheres. Surfaces 112A and 122A form a portion of an outer sphere with a radius $R_1$. Surfaces 112B conforming to surface 114A, and surface 122B conforming to surface 124B form a portion of inner sphere ($R_2$) which has the same center of curvature with the outer sphere. The focal surface 140 of the lens 100 is also a spherical surface ($R_f$) which is concentric at the same center of curvature with other spherical surfaces.

The lens 100 does not have a single preferred optic axis as in many conventional lenses. In an effect, it has many optic axes all going through the common center of curvature shared by the concentric spherical surfaces. A ray entering the lens 100 from the first semi spherical part 110 goes through the outer semi spherical part 112 and the inner semi spherical part 114, refracts first at the aspheric surface 114B to enter the air gap 130 and then at the aspheric surface 124B to enter the second semi spherical part 120. Each entering ray defines its own opt-c axis. Hence, the lens 100 has a spherical symmetry and is essentially free of off-axis aberrations.

The air gap 130 is specially designed to perform a number of functions. The thickness of the air gap 130 may be sufficiently large to accommodate the profiles of the interfacing surfaces 114B and 124B so they do not touch each other. The air gap 130 effects an aperture stop in the lens 100 and hence determines the f number (focal to aperture ratio) or the speed of the lens 100. Since the lens 100 does not have a preferred optic axis and the aperture stop is located in the center of symmetry of the concentric surfaces, the field of view can approach 180°, which is difficult to achieve with many other lens systems. The symmetric position of the stop formed by the air gap 130 also eliminates off-axis aberrations (including coma and stigmatism) in the lens 100 to achieve uniform imaging across the entire field of view. Further, the optical gap 130 provides optical refraction at its two interfaces with the elements 110 and 120 to compensate for spherical aberration by implementing specially designed aspheric surfaces 114B and 124B.

The aspheric surfaces 114B and 124B may be designed in such a way that their combined effect produces an aspheric correction to compensate for the spherical aberration of the spherical surfaces. The aspheric surface profile may be described by an even-order polynomial expansion, $y=ax^2+bx^4+cx^6 \ldots$, where the coefficients a, b, c, etc. are determined by design. FIG. 2 shows one implementation in which one of the aspheric interfacing surfaces (e.g., 114B) is flat and the other (e.g., 124B) is mildly aspheric. The aspheric surface 124B may preferably have a slight vertex curvature (i.e., $a \neq 0$) to optimize the performance. Such aspheric correction may be designed, e.g., by adjusting the coefficients of the polynomial expansion, to achieve a substantial correction over a selected range of field angles. Alternatively, both surfaces 114B and 124B may not be flat and both have desired aspheric surface profiles.

The inner part and the outer part of each semi spherical part 110, 120 may be formed of two different optical materials with different dispersions to correct chromatic aberration over a selected range of wavelengths such as the visible range or any other desired range. The outer parts 112 and 122 may use a high dispersion material and the inner parts 114 and 124 use a low dispersion material to produce a net positive focusing power. The indices of refraction of the optical materials should be selected that the focal surface 140 is located outside the surface 122A. A number of optical materials may be used to form the lens 100, including glasses and plastics. Plastics may be preferred in certain applications for ease of fabrication and low cost.

For certain applications where chromatic correction is not required (e.g., imaging at a selected wavelength), the concentric lens 100 may be simplified by using the same material for the outer parts 112, 122 and the inner parts 114, 124 or by eliminating the outer concentric part 112 and 122. In the latter implementation, the lens 100 has a simple concentric structure with only two spaced semi spherical parts 114 and 124 as shown in FIG. 2.

One imaging system based on the concentric lens 100 may place a spherical sensing array that conforms to the concentric imaging surface 140. The sensing array includes photosensitive pixels that convert received photons into pixel signals. One embodiment of the pixel is the active pixel having an integral active amplifier within each pixel.

Alternatively, a flat sensing array may be used to receive the images from the lens 100. Since the imaging surface 140 is spherical, an optical converting device may be used to convert the spherical image into a flat two-dimensional image. FIG. 3 shows an imaging system 300 where a concave-plano fiberoptic faceplate 310 is used to project the image formed on the spherical imaging surface 140 onto a flat sensor array 320. The fiberoptic faceplate 310 has a spherical surface 312 that conforms to the imaging plane 140 and a flat surface 314 that conforms to the flat sensor array 320. Optical fibers 313 are used to transmit the light received by the spherical surface 312 to the flat surface 314.

Although only a few embodiments are described, various modifications and enhancements may be made without departing from the following claims.

What is claimed is:

1. An optical device, comprising:
a first optical element, having a first convex spherical surface of a first radius to receive radiation and a first non-spherical surface to receive said radiation from said first convex spherical surface; and
a second optical element, having a second convex spherical surface of said first radius and a second non-spherical surface, positioned relative to said first optical element so that said first and second convex spherical surfaces have a common center of curvature and said first and second non-spherical surfaces are separated from each other by an air gap,
wherein at least one of said first and second non-spherical surfaces has an aspheric surface profile to correct spherical aberrations.

2. A device as in claim 1, wherein one of said first and second non-spherical surfaces has a flat surface profile.

3. A device as in claim 1, wherein said aspheric surface profile is determined by an even-order polynomial expansion.

4. A device as in claim 1, further comprising two outer optical elements, each having a concentric outer convex spherical surface and a concentric inner concave spherical surface having said first radius, wherein said outer optical elements are respectively coupled to said first and second optical elements by engaging their inner concave spherical surfaces to said first and second convex spherical surfaces, respectively.

5. A device as in claim 4, wherein said two outer optical elements are formed of a first optical material and said first and second optical elements are formed of a second optical material that has a dispersion different from a dispersion of said first optical material at least at one wavelength to reduce chromatic aberration.

6. A device as in claim 1, wherein said first and second optical elements are formed of a plastic material.

7. A device as in claim 1, further comprising a sensing array disposed to receive radiation from said second convex spherical surface of said second optical element, said array having a plurality of photosensitive pixels to detect said radiation.

8. A device as in claim 7, wherein said sensing array is formed on a curved surface.

9. A device as in claim 7, wherein said sensing array is formed over a flat surface and further comprising an optical converting device positioned between said second optical element and said sensing array to covert a curved image output from said second optical element into a flat image onto said sensing array.

10. A method for receiving an optical image, comprising:
receiving light by using a first optical element having a first convex spherical surface and a first non-spherical surface;
propagating the light through the first optical element to the first non-spherical surface to exit the first optical element into the air;
coupling the light from the air into a second optical element having a second convex spherical surface and a second non-spherical surface through the second non-spherical surface, wherein the second convex spherical surface has a common center of curvature with the first convex spherical surface;
reducing spherical aberration in the light caused by said first and second optical elements by making at least one of said first and second non-spherical surfaces to have an aspheric surface profile; and
propagating the light through the second optical element to form an image at a spherical surface that is concentric with the first and second convex spherical surfaces.

11. A method as in claim 10, wherein one of said first and second non-spherical surfaces is flat.

12. A method as in claim 10, wherein said aspheric surface profile is determined by an even-order polynomial expansion.

* * * * *

UNITED STATES PATENT AND TRADEMARK OFFICE
CERTIFICATE OF CORRECTION

Page 1 of 1

PATENT NO. : 6,097,545
DATED : August 1, 2000
INVENTOR(S) : Arthur H. Vaughan

It is certified that error appears in the above-identified patent and that said Letters Patent is hereby corrected as shown below:

<u>Column 4,</u>
Line 38, please replace "covert" with -- convert --.

Signed and Sealed this

Seventh Day of May, 2002

Attest:

Attesting Officer

JAMES E. ROGAN
*Director of the United States Patent and Trademark Office*